(No Model.)
S. M. LILLIE.
Process of Sugar Refining and Apparatus for Carrying on the Same.
No. 238,509. Patented March 8, 1881.
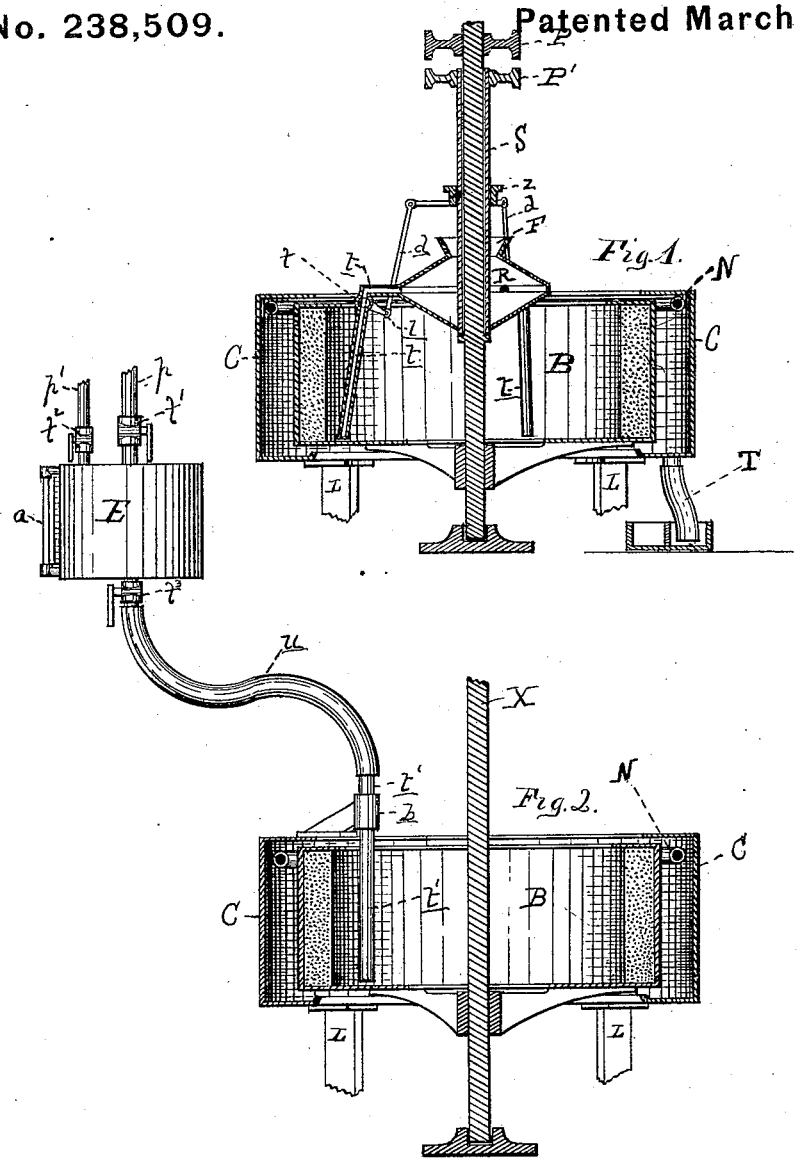

UNITED STATES PATENT OFFICE.

S. MORRIS LILLIE, OF PHILADELPHIA, PENNSYLVANIA.

PROCESS OF SUGAR-REFINING AND APPARATUS FOR CARRYING ON THE SAME.

SPECIFICATION forming part of Letters Patent No. 238,509, dated March 8, 1881.

Application filed May 7, 1880. (No model.)

*To all whom it may concern:*

Be it known that I, S. MORRIS LILLIE, of Philadelphia, in the county of Philadelphia and State of Pennsylvania, have invented a new and useful Improved Process of Sugar-Refining and Apparatus for Carrying on the Same, of which the following is a specification.

My improvements relate to the process of refining for the production of "soft" or "centrifugal" sugars; and they consist in washing and purifying the lower grades of sugars in the centrifugal machines with a suitable washing-liquor, and in collecting the impurities thus removed from the said sugars in the final sirup or molasses, all as hereinafter more fully described.

The process of draining in the centrifugal machine frees the sugar-crystals more or less completely of the mother-liquor (sirup) with which they are mixed as they come from the evaporating-pans. The sugar remains in the basket of the machine while the sirup flows through the meshes of the sieve away from the sugar. This drained sugar is ready for market, and consists of pure sugar crystals or grain mixed with a certain quantity of the mother-liquor or sirup, and the quality of the sugar, as regards gumminess, color, and impurities, will depend upon the quality of the mother-liquor remaining in it, which will, in turn, depend upon the character of the raw sugars used.

The product of a soft-sugar refinery consists of several grades of sugar, and of a sirup or molasses from which no more sugar can profitably be extracted, and which is sold as sirup.

The process of refining consists, in general, in dissolving the raw sugars in water to form "liquors," which are subjected to certain clarifying, decolorizing, and purifying processes, then evaporated until the sugaring has been properly effected, and, finally, the magmas thus produced are drained of most of their contained sirups in the centrifugal machines. The sirups flowing from the sugars are reboiled, either by themselves or otherwise, and an additional percentage of sugar separated from them, the sirup resulting from which is again reboiled, if its richness in extractable sugar justifies it, and this reboiling is continued until a final sirup is obtained from which no more sugar can economically be extracted.

I will now give the workings of a soft-sugar refinery according to a common system of refining, and then my improvements on the same. In this refinery we will suppose there are made eleven (11) grades of soft sugars, the lowest of which is termed the "bastards," and the rest numbered from one to ten, respectively. These eleven grades of sugar and the resulting final sirup form the product of one cycle of work. To make these eleven grades of sugar, the raw sugars are dissolved to form liquors of ten different qualities, which, after having been subjected to certain clarifying and decolorizing processes, are boiled separately, commencing with the best, or No. 1, to form ten different grades of sugar. There are formed, likewise, ten grades of sirup, separated respectively from the different grades of sugar by the draining process in the centrifugal machine. These sirups contain too much extractable sugar to be sold as sirup, and they are, consequently, reboiled, each sirup being mixed with a liquor of a lower grade and reboiled with it, excepting the sirups from the last few grades of sugar, which sirups are reboiled together, forming the "bastard filling," from which the bastard sugar is obtained. The sirup from the bastard sugar is too poor to be again reboiled, and is hence sold as sirup.

The grades of liquor with which the various sirups will be reboiled, and the number of the poorer-grade sirups that will be taken for the bastards, will depend upon the qualities of the raw sugars used and the richness of the resulting liquors and sirups.

In the following table I give an order of using the sirups which might be followed under certain circumstances:

First-grade sirup is reboiled with fourth-grade liquor.
Second-grade " " " " fifth-grade "
Third-grade " " " " sixth-grade "
Fourth-grade " " " " seventh-grade "
Fifth-grade " " " " eighth-grade "
Sixth-grade " " " " ninth-grade "
Sev'th-grade " " " " tenth-grade "
Eighth grade " }
Ninth-grade " } are reboiled together to form the bastards.
Tenth-grade " }
Bastard sirup is sold and not reboiled.

The sugars will increase in color and decrease in general appearance and value from the first grade to the lowest grade, or bastards.

As before stated, each grade of sugar is composed of pure sugar mixed with a certain proportion of the same grade sirup, and the appearance of each sugar will depend upon the quality of the sirup contained in it. Thus the first sugar is composed of pure sugar mixed with some of the first sirup, the second sugar of pure sugar and second sirup, the fourth sugar of pure sugar and fourth sirup, and the bastard sugar of pure sugar and bastard sirup. Hence each sugar is composed of pure sugar mixed with some of the sirup of the same grade. If, now, the sirups contained in the lower grades of sugar be raised in quality to equal that of the sirups contained in the higher grades, the qualities of the sugars will also be raised to correspond with those of the higher-grade sugars. The sirup flowing from the sugar after commencing the washing will be richer—i. e. purer—by virtue of its containing some of the high-grade washing liquor, than the sirup which flowed from it before; and my improvements further consist in keeping the washings separate from the sirups, in the case of the bastards, at least, and in reboiling them as their purity may justify. If the washings of the bastards were not kept separate from the sirup, a considerable amount of extractable sugar would pass into the sirup and be sold as such, thus entailing a considerable pecuniary loss. To a less degree it would be advantageous to keep all of the washings separate from the sirups, for, as before stated, the washings of a sugar are purer than the sirup separated from the sugar, and hence the purity of the washings would warrant their being reboiled with a higher-grade liquor than that with which the sirup would be reboiled. Thus, if the washings of the eighth, ninth, and tenth were kept separate from their respective sirups they need not be reboiled with the sirups for the bastards, but could be reboiled with one of the liquors, thus making less of the bastard sugar and more of the higher grades than would otherwise have been the case. If the washings are kept separate from the sirups, it does not matter very much what the washing-liquor may be, as the washings would be treated as their quality might demand. Water, even, might be used, which would dissolve much more of the sugar-grain than would a partially-saturated solution of sugar in water—i. e., a sirup or a liquor—and so, in the case of the bastards, would carry a large amount of extractable sugar into the last sirup, to be sold as such at a considerable loss were not the washings kept separate. The washing-liquor may be charged with any reagent which it may be wished to use to improve the appearance of the product—thus with a little bluing, chlorine, sulphurous acid, or any other reagent.

Having described the principle of my invention or improvements—viz., the washing of the different low grades of soft sugars in the centrifugal machines with a suitable washing-liquor, the keeping the washings from the bastards, and, preferably, from one or more other grades of sugar separate from the respective sirups, and the reboiling of the said washings as their quality may justify—I will now give a particular way of applying the improvements in a sugar-house working as indicated by the table hereinbefore given.

The first and second sirups are not reboiled, as indicated in the table, but are kept, and are used as the washing-liquor for the lower grades of sugar—say, the sixth, seventh, eighth, ninth, tenth, and bastard sugars. The sirups from and exclusive of the second down are reboiled, as shown in the table. The first, second, third, fourth, and fifth sugars remain the same as though no washing was practiced, excepting that there is less of the fourth and fifth sugars, owing to the first and second sirups not being reboiled with the fourth and fifth grade liquors. The remaining sugars are washed as follows: Each charge or machine full of sugar is drained in the centrifugal machine the usual length of time, or preferably longer, so that more of the sirup may be separated from the sugar and less remain to be washed out by the washing-liquor. Then, the machine still being in motion, the washing-liquor is sprayed onto the face of the sugar in the machine by any suitable means. Urged by the centrifugal force, the washing-liquor flows through the sugar and carries with it the original sirup remaining in the sugar and replaces it. Thus the quality of the sugar is raised in virtue of the original sirup being replaced by the higher-quality washing-liquor. The washing of the sugar is continued until the sugar has been raised to the desired grade. The machine is then stopped, and the sugar removed from it, as usual. The washings of the eighth, ninth, and tenth sugars are kept apart from the respective sirups, and are reboiled as their richness may demand. The washings of the bastard sugar are also kept separate from the sirup and reboiled with the bastards of the next cycle of work. The first sirup is used for washing the sixth-grade sugar and as many of the succeeding grades as it may suffice for, and the remainder of the sugars are washed with the second sirup. Under some circumstances the first and second sirups would not be sufficient to wash all of the sugars, in which case the third sirup, or a portion of it, at least, would have to be reserved for washing purposes.

The washing-sirups may be used at any degree of dilution, from the very thick condition in which they leave the machine down. The more dilute they are the farther they will go in washing, but the greater will be the amount of the grain of the sugar dissolved. The former effect of dilution is an advantageous one, but the latter is a disadvantageous one.

The result of this system of washing is to transfer the impurities, coloring-matter, &c., contained in the sugars washed from the said sugars to the final sirup. This will appear by following the course of the impurities washed from the sixth, seventh, eighth, ninth, tenth, and bastard sugars by the scheme of the washing above described. The impurities of the sixth and seventh sugars are carried by the washings into the sixth and seventh sirups, and with them are reboiled with the ninth and tenth grade liquors. These impurities are not crystallizable, and therefore pass into the ninth and tenth sirups, when the latter are separated from the ninth and tenth sugars by the centrifugal machines. The ninth and tenth sirups are reboiled as bastards, and when the bastard sirup is separated from the bastard sugar the uncrystallizable impurities which have been brought down from the sixth and seventh sugars pass into it. The impurities of the eighth, ninth, and tenth sugars pass into the washings from the same, which are kept separate from the magma-sirups, and which, we will suppose, are reboiled with the tenth-grade liquid of the next cycle of work, which being the case, the impurities of the eighth, ninth, and tenth sugars will pass into the tenth sirup of the next cycle of work. This tenth sirup will be reboiled with the bastards of that cycle of work, and on separating the bastard sirup from its sugar the uncrystallizable impurities brought down from the eighth, ninth, and tenth sugars will pass into it. The impurities washed from a bastard sugar pass with the washings into the bastard liquor of the next cycle of work, and thence into the bastard sirup from the same. Thus it is seen that by this system of washing the coloring-matters, impurities, &c., which are contained in and depreciate the value of the lower grades of sugar are removed from the same and are collected in the final sirup, where they can do no harm.

In the drawings I have shown centrifugal machines which are specially adapted for use in connection with my improvements.

Figure 1 is a vertical section of such a machine through its axis, and Fig. 2 is a similar section of another machine, differently arranged from the first.

In Fig. 1, B is the basket of the machine, C the case surrounding the same and supported by the legs L L, and X is the axle of the machine. On the axle X is a sleeve, S, supported by a shoulder on the axle, and bearing at its lower extremity a central reservoir, R, surmounted by a funnel, F, for convenience in filling the former. The reservoir R is large enough to hold sufficient of the liquor for washing a charge of sugar.

Radiating from the reservoir are a number of tubes, t, which bend down into and extend nearly to the bottom of the machine, and are slightly inclined away from the center, as shown, to facilitate the flow of the washing-liquor, urged by centrifugal force, as hereinafter explained, through and down the tube. Each tube is pierced, on the side toward the circumference of the machine, with fine perforations, through which the washing-liquor may flow and be sprayed upon the face of the sugar in the machine. There is a faucet, $f$, in each tube, the lever $l$ of which is connected, by a connecting-rod, $d$, with a sleeve, $z$, keyed upon the sleeve S, but capable of a vertical motion on the same, which may be imparted to it by a lever (not shown) in the usual manner, employed for moving sleeves longitudinally on revolving shafts. By raising or lowering the sleeve $z$ all of the faucets $f$ are simultaneously closed or opened, and when the latter is the case the washing-liquor in the central reservoir R, urged by centrifugal force due to the revolution of the reservoir and tubes, will flow through the tubes $t$ and be sprayed upon the face of the sugar in the machine.

P is a pulley upon the axle of the machine, by which it is driven. P' is a pulley on the sleeve S, by which the latter has a motion imparted to it different, either in direction or in degree, from that of the axle X and the basket of the machine, so that each spray-pipe $t$ will deliver the washing-liquor upon all of the sugar in the machine, and not simply upon one portion of it, as would be the case was there no relative motion between the spray-pipes and the basket of the machine. This relative motion can be effected in another way—viz., by having the sleeve supplied with a brake instead of the pulley P', whereby may be retarded the motion of the sleeve S, imparted to it by the revolving axle X, in virtue of the friction between them.

Encircling the interior of the case of the machine, near the top, is a hot-water pipe, N, suitably perforated, so that when desired the case of the machine may be washed out with hot water. The case C of the machine has a flexible or jointed discharge pipe or spout, T, by which the sirups, in flowing from the case, may be made to flow into any one of several troughs leading to as many different tanks designed for holding the sirups.

The operation of the machine is as follows: The basket of the machine having received its charge of the magma and the sleeve Z being up, and consequently all of the faucets $f$ closed, a quantity of the washing-liquor sufficient for washing one charge is run into the central reservoir, R, through the funnel F. The flexible spout T of the case C is turned to discharge into the trough leading to the sirup-tanks and the machine is started. The sleeve S is started revolving at the same time, or it may be started at the proper time for commencing the washing. The time to commence washing having arrived, if it is wished to keep the washings separate from the sirup, the sirup adhering to the case of the machine is all washed out by hot water introduced through the pipe N, and the spout of the case is turned to discharge into the trough leading to the tanks for receiving the washings. This done, the central reservoir is put in motion, if not already so, and having reached sufficient velocity the sleeve Z is raised by its lever, which opens all of the faucets $f$, and allows the washing-liquor to flow through the spray-pipes $t$ upon the face of the sugar, through which it passes, washing it into the case of the machine, and thence through the spout and trough into the tanks for the washings. This finishes the treatment of the charge, and the machine is now stopped and the sugar removed.

Before starting another charge the washings adhering to the case of the machine may be washed out of the same and into the tanks for washings by means of hot water from the pipe N, and this having been done the spout of the case is turned to discharge into the sirup-trough, and another charge is started.

I would remark here that if the spray-pipes $t$ were sufficient in number, and the perforations in them so arranged that the sprayings from adjacent tubes would meet or lap each other, the sleeve S might be dispensed with, and the central reservoir attached directly to the axle X, so that it and the tubes $t$ would revolve with the basket of the machine, for in this case no relative motion between the tubes $t$ and the basket B would be necessary to insure the entire surface of the sugar in the machine being sprayed.

In Fig. 2 is shown another arrangement for spraying the washing-liquor on the sugar in the machine, and it is a vertical and axial section of the machine. In it the parts common to it and to Fig. 1 are lettered as in Fig. 1. The washing-liquor is sprayed upon the face of the sugar in the revolving machine by means of a vertical spray-pipe, $t'$, supported and held by the bracket $b$ on the top of the casing C of the machine. The perforations of the pipe $t'$ extend up and down its length on the side toward the sugar within the limits of the basket of the machine. The upper extremity of the pipe $t'$ is connected by a flexible tube, $u$, having a faucet, $f^3$, with a measuring-cylinder, E, for measuring the washing-liquor used. The cylinder E communicates with a reservoir of the washing-liquor by means of the pipe $p$, provided with a faucet, $f'$, and with some source of steam or air pressure by means of the pipe $p'$, having a three-way valve or faucet, $f^2$, by which communication may be opened between the cylinder E and either the atmosphere or the steam or air pressure, as may be desired.

The quantity of the washing-liquor in the cylinder E may be known by means of the gage-glass $a$ and the scale alongside of it.

The operation of the above combination of parts is as follows: The charge in the machine being ready for washing, and the cylinder E having been filled, or partially so, with washing-liquor from the pipe $p$, and the faucet $f'$ of the latter closed, the three-way faucet $f^2$ is turned so as to turn the steam or air pressure onto the surface of the liquor in the cylinder E. This having been done, the faucet $f^3$ in the tube $u$ is opened and the washing-liquor is allowed to flow, in spray, from the spray-pipe $t'$ upon the face of the sugar in the machine until the desired amount, as shown by the gage-glass $a$, has been used, and then the valve $f^3$ is closed again. The tube $u$ is made flexible, so that when the washing is not in progress the spraying-tube $t'$ may be raised in the bracket $b$ until it no longer protrudes inside the basket of the machine.

The spray-pipe $t'$ may also be arranged and operated as follows: Instead of being perforated along its length it may have a rose at its lower extremity to spray in a direction at right angles to the length of the pipe $t$. During washing the pipe (and rose) is moved up and down in the bracket $b$ by hand or otherwise, so that the rose may play on all portions of the sugar in the machine. After a little experience it can be readily known when the proper amount of washing-liquor has been used, without measuring; but the cylinder E, with its connections, affords a very good means of giving to the washing-liquor a sufficient pressure, so that it may spray properly. This pressure or head might also be obtained by having the reservoir of the washing-liquor sufficiently high above the machines.

The machine shown in Fig. 2 has the hot-water pipe N encircling its case on the inside, and its case also has the flexible spout, all as in the machine shown in Fig. 1, and for the same purposes.

I do not claim as my invention either the process of draining sugar-magmas by centrifugal force or the reboiling of the sirups separated from them in an order or manner determined by their purities, as I am aware that both are old and have been long practiced.

Having described my invention, I claim as mine, and wish to secure to myself by Letters Patent, as follows:

1. The within-described improvements on the process of sugar-refining, consisting in using the magma-sirups separated from the higher-grade sugars of the process as liquors for washing the lower-grade sugars of the same, the washing being effected while the sugars are being subjected to the action of the centrifugal force in the draining-machines, washings and sirups from the said lower-grade sugars being reboiled as their purities or circumstances may warrant, substantially as specified.

2. The within-described improvements on the process of sugar-refining, consisting in washing, with a suitable washing-liquor, the lower-grade sugars while they are being subjected to action of the centrifugal force in the draining-machines, in keeping the washings of the sugars separate from the magma-sirups first separated from the same, and in reboiling the washings as their purities or circumstances may warrant, substantially as specified.

3. In a centrifugal machine in which liquoring is to be practiced having a central hopper mounted on its axle, with tubes radiating from the same to the basket of the machine for the purpose of conveying the washing-liquor from the hopper to the basket, the combination, with the said radiating tubes, of suitable valves or faucets, and mechanism by which the valves or faucets may be opened and closed at will while the machine is in motion, to permit or prevent a flow of the washing-liquor through the radiating pipes, substantially as specified.

4. In a centrifugal-machine in which washing is to be practiced, a central hopper, with tubes radiating to the basket of the machine, mounted on a sleeve on the axle, so that the central hopper and radiating tubes may have a motion or revolution relative to the axle and basket of the machine, in combination with mechanism by which the said relative motion may be produced, substantially as specified.

S. MORRIS LILLIE.

Witnesses:
W. W. DOUGHERTY,
JAMES J. KEATING.

Correction of Letters Patent No. 238,509.

It is hereby certified that in Letters Patent No. 238,509, granted March 8, 1881, to S. Morris Lillie for an improvement in the "Process of Sugar Refining and Apparatus for Carrying on the same," the following paragraph, to wit:

"My improvements consist in thus raising the qualities of the lower grade sugars by washing each of them in the machines with a magma sirup separated from one of the higher grade sugars, or with any suitable washing liquor, and in reboiling the washings as their purities or circumstances may warrant," forming a part of the specification was inadvertantly omitted after the sentence ending with the word "sugars" in line 17, page 2 of the printed specification attached to and forming a part of said Letters Patent; also that a comma was inadvertantly omitted after the words "washing it" in line 1, page 4 of said printed specification; that the proper corrections have been made in the files and records of the Patent Office and are hereby made in said Letters Patent.

Signed, countersigned, and sealed this 25th day of March, A. D. 1881.

[SEAL.]

A. BELL,
*Acting Secretary of the Interior.*

Countersigned:
E. M. MARBLE,
*Commissioner of Patents.*